US006862970B2

(12) United States Patent
Aghajanian et al.

(10) Patent No.: US 6,862,970 B2
(45) Date of Patent: Mar. 8, 2005

(54) BORON CARBIDE COMPOSITE BODIES, AND METHODS FOR MAKING SAME

(75) Inventors: Michael K. Aghajanian, Newark, DE (US); Allyn L. McCormick, Oxford, PA (US); Bradley N. Morgan, New London, PA (US); Anthony F. Liszkiewicz, Jr., Lincoln University, PA (US)

(73) Assignee: M Cubed Technologies, Inc., Monroe, CT (US)

( * ) Notice: Subject to any disclaimer, the term of this patent is extended or adjusted under 35 U.S.C. 154(b) by 41 days.

(21) Appl. No.: 09/990,175

(22) Filed: Nov. 20, 2001

(65) Prior Publication Data

US 2003/0110931 A1 Jun. 19, 2003

Related U.S. Application Data

(60) Provisional application No. 60/329,358, filed on Oct. 15, 2001, now abandoned, and provisional application No. 60/252,489, filed on Nov. 21, 2000, now abandoned.

(51) Int. Cl.$^7$ .................................................. F41H 5/02
(52) U.S. Cl. ..................................... 89/36.02; 109/49.5
(58) Field of Search ............................ 89/36.02, 36.01; 428/911; 109/49.5

(56) References Cited

U.S. PATENT DOCUMENTS

| 3,205,043 A | 9/1965 | Taylor |
| 3,275,722 A | 9/1966 | Popper |

(List continued on next page.)

FOREIGN PATENT DOCUMENTS

| DE | 30 05 586 A1 * | 8/1981 | ................ 89/36.02 |
| WO | WO 00/062007 A2 | 10/2000 | |

OTHER PUBLICATIONS

Dennis J. ViechnickI, Michael J. Slavin and Morton I. KlIman, "Development and Current Status of Armor Ceramics", *Ceramic Bulletin*, vol. 70, No. 6, pp. 1035–1039 (1991).

D. ViechnickI, W. Blumenthal, M. Slavin, C. Tracy, and H. Skeele, "Armor Ceramics—1987", pp. 27–53, presented at Third TACOM Armor Coordinating Conference, Feb. 17–19, 1987, Monterey, California.

Roy C. Laible, "Ceramic Composite ArMOR", in *Ballistic Materials and Penetration Mechanics*, pp. 150–151, Elsevier Scientific Publishing Co., (1980).

"Reaction–Bonded Silicon Carbide", *Ceramics and Glasses Handbook*, American Society for Materials, p. 293, 1990.

*Primary Examiner*—Stephen M. Johnson
(74) *Attorney, Agent, or Firm*—Jeffrey R. Ramberg

(57) ABSTRACT

A composite body produced by a reactive infiltration process that possesses high mechanical strength, high hardness and high stiffness has applications in such diverse industries as precision equipment and ballistic armor. Specifically, the composite material features a boron carbide filler or reinforcement phase, and a silicon carbide matrix produced by the reactive infiltration of an infiltrant having a silicon component with a porous mass having a carbonaceous component. Potential deleterious reaction of the boron carbide with silicon during infiltration is suppressed by alloying or dissolving boron into the silicon prior to contact of the silicon infiltrant with the boron carbide. In a preferred embodiment of the invention related specifically to armor, good ballistic performance can be advanced by loading the porous mass or preform to be infiltrated to a high degree with one or more hard fillers such as boron carbide, and by limiting the size of the largest particles making up the mass. The instant reaction-bonded silicon carbide (RBSC) composite bodies surpass previous RBSC's as armor materials, and in this capacity approach the ballistic performance of current carbide armor ceramics but with potentially lower cost manufacturing methods, e.g., infiltration techniques.

25 Claims, 5 Drawing Sheets

U.S. PATENT DOCUMENTS

| | | |
|---|---|---|
| 3,495,939 A | 2/1970 | Forrest |
| 3,725,015 A | 4/1973 | Weaver |
| 3,796,564 A | 3/1974 | Taylor et al. |
| 3,857,744 A | 12/1974 | Moss |
| 3,859,399 A | 1/1975 | Bailey et al. |
| 3,998,646 A | 12/1976 | Weaver |
| 4,019,913 A | 4/1977 | Weaver et al. |
| 4,104,062 A | 8/1978 | Weaver |
| 4,154,787 A | 5/1979 | Brown |
| 4,692,418 A | 9/1987 | Boecker et al. |
| 4,868,040 A | 9/1989 | Hallal et al. |
| 4,876,941 A | 10/1989 | Barnes et al. |
| 4,944,904 A | 7/1990 | Singh et al. |
| 5,180,697 A | 1/1993 | Claar et al. |
| 5,205,970 A | 4/1993 | Brun et al. |
| 5,372,978 A | 12/1994 | Ezis |
| 5,571,758 A | 11/1996 | Grossman |
| 5,840,221 A | 11/1998 | Lau et al. |
| 5,955,391 A * | 9/1999 | Kameda et al. .............. 428/384 |
| 6,074,750 A * | 6/2000 | Brun et al. .................. 428/366 |
| 6,245,424 B1 * | 6/2001 | Lau et al. ................... 428/368 |

\* cited by examiner

BORON CARBIDE COMPOSITE BODIES, AND METHODS FOR MAKING SAME

This patent document claims the benefit of U.S. provisional patent application serial Nos. 60/329,358, and 60/252,489, filed on Oct. 15, 2001, and Nov. 21, 2000, respectively both now abandoned.

BACKGROUND OF THE INVENTION

1. Field of the Invention

This invention relates to metal-ceramic composite bodies produced by a reactive infiltration process, e.g., reaction-bonded bodies. More particularly, the invention relates to reaction-bonded silicon carbide having a boron carbide filler or reinforcement, and to ballistic armor structures produced from reaction-bonded silicon carbide bodies. The instant composite bodies are also extremely rigid, which in combination with their low specific gravity potential makes them attractive candidate materials for applications in precision equipment such as machines used to fabricate semiconductors.

2. Discussion of Related Art

In many applications, weight is not a critical factor, and traditional materials such as steel can offer some level of protection from airborne threats such as ballistic projectiles and shell fragments. Steel armors offer the advantage of low cost and the fact that they also can serve as structural members of the equipment into which they are incorporated. In recent decades, certain hard ceramic materials have been developed for certain armor applications. These ceramic-based armors, such as alumina, boron carbide and silicon carbide provide the advantage of being lighter in mass than steel for the same ballistic stopping power. Thus, in applications in which having an armor having the lowest possible mass is important, such as (human) body armor and aircraft armor, low specific gravity armor materials are called for. The lower the density, the greater the thickness of armor that can be provided for the same areal density. In general, a thick armor material is more desirable than a thinner one because a greater volume of the armor material can be engaged in attempting to defeat the incoming projectile. Moreover, the impact of the projectile on a thicker armor plate results in less tensile stress on the face of the plate opposite that of the impact than that which would develop on the back face of a thinner armor plate. Thus, where brittle materials like ceramics are concerned, it is important to try to prevent brittle fracture due to excessive tensile stresses on the back face of the armor body; otherwise, the armor is too easily defeated. Rather, by preventing such tensile fracture, the kinetic energy of the projectile perhaps can be absorbed completely within the armor body, which energy absorption manifests itself as the creation of a very large new surface area of the armor material in the form of a multitude of fractures, e.g., shattering.

U.S. Pat. No. 5,372,978 to Ezis discloses a projectile-resistant armor consisting predominantly of silicon carbide and made by a hot pressing technique. Up to about 3 percent by weight of aluminum nitride may be added as a densification aid. The finished product features a microstructure having an optimal grain size of less than about 7 microns. Fracture is intergranular, indicating energy-absorbing crack deflection. Moreover, the economics of manufacturing are enhanced because less expensive, less pure grades of silicon carbide can be used without compromising the structural integrity of the material.

U.S. Pat. No. 4,604,249 to Lihleich et al. discloses a composition particularly suited for armoring vehicles. The composition is a composite of silicon carbide and steel or steel alloy. Silicon and carbon particulates, optionally including silicon carbide particulates, are mixed with an organic binder and then molded to form a green body. The green body is then coked at a maximum temperature in the range of about 800° C. to about 1000° C. The temperature is then rapidly raised to the range of about 1400° C. to about 1600° C. under an inert atmosphere of at least one bar pressure. In this temperature range, the silicon and carbon react to form silicon carbide, thereby producing a porous body. The pores are then evacuated in a vacuum chamber, and the body is immersed in molten steel or steel alloy. The metal fills up the pores to produce a dense composite armor material.

U.S. Pat. No. 4,104,062 to Weaver discloses a high density, aluminum-modified boron carbide composition that is well suited as protective armor against ballistic projectiles. About 70 to 97 percent by weight of boron carbide powder is blended with about 3 to about 30 percent of aluminum powder. A temporary binder is added to this mixture, and a preform is pressed. This preform is then hot pressed in an oxygen-free atmosphere at a pressure of at least 500 psi (3.5 MPa) at a temperature of from 1800° C. to about 2300° C.

U.S. Pat. No. 3,857,744 to Moss discloses a method for manufacturing composite articles comprising boron carbide. Specifically, a compact comprising a uniform mixture of boron carbide particulate and a temporary binder is cold pressed. Moss states that the size of the boron carbide particulate is not critical; that any size ranging from 600 grit to 120 grit may be used. The compact is heated to a temperature in the range of about 1450° C. to about 1550° C., where it is infiltrated by molten silicon. The binder is removed in the early stages of the heating operation. The silicon impregnated boron carbide body may then be bonded to an organic resin backing material to produce an armor plate.

U.S. Pat. No. 3,859,399 to Bailey discloses infiltrating a compact comprising titanium diboride and boron carbide with molten silicon at a temperature of about 1475° C. The compact further comprises a temporary binder that, optionally, is carbonizable. Although the titanium diboride remains substantially unaffected, the molten silicon reacts with at least some of the boron carbide to produce some silicon carbide in situ. The flexural strength of the resulting composite body was relatively modest at about 140 MPa. A variety of applications is disclosed, including personnel, vehicular and aircraft armor.

U.S. Pat. No. 3,796,564 to Taylor et al., filed in 1967, discloses a hard, dense carbide composite ceramic material particularly intended as ceramic armor. Granular boron carbide is mixed with a binder, shaped as a preform, and rigidized. Then the preform is thermally processed in an inert atmosphere with a controlled amount of molten silicon in a temperature range of about 1500° C. to about 2200° C., whereupon the molten silicon infiltrates the preform and reacts with some of the boron carbide. The formed body comprises boron carbide, silicon carbide and silicon. Taylor et al. state that such composite bodies may be quite suitable as armor for protection against low caliber, low velocity projectiles, even if they lack the optimum properties required for protection against high caliber, high velocity projectiles. Although they desire a certain amount of reaction of the boron carbide phase, they also recognize that excessive reaction often causes cracking of the body, and they accordingly recognize that excessive processing temperatures and excessively fine-grained boron carbide is harmful in this regard. At the same time, they also realize that excessively large-sized grains reduce strength and degrade ballistic performance.

Each of the above-described armor inventions suffers from one shortcoming or another. Hot pressing is expensive and shape-limited. Hot pressed or sintered ceramics do not hold dimensional tolerances as well as reaction-bonded silicon carbide ("RBSC"). Iron matrix composite materials are heavy in relation to ceramic armors. The prior RBSC armors having a boron carbide reinforcement, sometimes referred to in this document as "reaction-bonded boron carbide" or "RBBC", lose some of the boron carbide, particularly the finer particle sizes, due to reaction with the silicon infiltrant, as well as yield significant coarsening of the microstructure, as will be shown in more detail below. An infiltration temperature of 2200° C. is too high, and will likely result in exaggerated grain growth, also deleteriously coarsening the microstructure.

As the preceding synopsis of the patent literature indicates, reaction-bonded or reaction-formed silicon carbide has been proposed and evaluated as a candidate armor material as long ago as the 1960's.

In the Third TACOM Armor Coordinating Conference in 1987, Viechnicki et al. reported on the ballistic testing of a RBSC material versus sintered and hot pressed silicon carbide materials. Not only was the RBSC substantially inferior to the other silicon carbides, Viechnicki et al. came to the general conclusion that purer, monolithic ceramics with minimal amounts of second phases and porosity have better ballistic performance than multiphase and composite ceramics. (D. J. Viechnicki, W. Blumenthal, M. Slavin, C. Tracy, and H. Skeele, "Armor Ceramics—1987," Proc. Third TACOM Armor Coordinating Conference, Monterey, Calif. (U.S. Tank-Automotive Command, Warren, Mich., 1987) pp. 27–53).

Accordingly, in spite of the price advantage of RBSC relative to sintered or hot pressed silicon carbide, what the market has preferred has been a sintered or hot pressed monolithic ceramic product. Until the introduction of the present assignee's product, there had been little or no RBSC armor on the market.

The details of a ballistic impact event are complex. One widely held theory of defeating a ballistic projectile is that the armor should be capable of fracturing the projectile, and then erode it before it penetrates the armor. Thus, compressive strength and hardness of a candidate armor material should be important. The above-mentioned armor patent to Taylor et al., for example, suggests a correlation between strength and ballistic performance. They noted that when the size of the largest grains exceeded 300 microns, both modulus of rupture and ballistic performance deteriorated. Keeping the size of the boron carbide grains below about 300 microns in diameter permitted their reaction-bonded boron carbide bodies to attain moduli of rupture as high as 260 MPa, and they recommended that for armor applications the strength should be at least 200 MPa.

There seems to be a consensus in the armor development community that hardness is indeed important in a candidate armor material, and in particular, that the hardness of the armor should be at least as great as the hardness of the projectile. As for the strength parameter, however, those testing armor materials have had a difficult time correlating mechanical strength (both tensile and compressive) with ballistic performance. In fact, except for hardness, there seems to be no single static property that functions as a good predictor of good armor characteristics in ceramic materials. Instead, the guidance that has been provided from the armor developers to the materials developers based upon actual ballistic tests has been that candidate armors in general should possess a combination of high hardness, high elastic modulus, low Poisson's ratio and low porosity. (Viechnicki et al., p. 32–33)

The instant inventors have re-visited RBSC, and even more particularly, RBBC as a candidate armor material because they believe that such a material can be developed whose anti-ballistic performance is competitive with other armor ceramics, such as the hot pressed armors, but at reduced cost.

Discussion of Commonly Owned Patent Applications

International Patent Application No. PCT/US99/16449, filed on Jul. 23, 1999, and which published as Publication No. WO 01/07377 on Feb. 1, 2001, teaches that reaction-bonded or reaction-formed silicon carbide bodies may be formed using an infiltrant comprising silicon plus at least one metal, e.g., aluminum. Modifying the silicon phase in this way permits tailoring of the physical properties of the resulting composite, and other important processing phenomena result: Such silicon carbide composite materials are of interest in the precision equipment, robotics, tooling, armor, electronic packaging and thermal management, and semiconductor fabrication industries, among others. Specific articles of manufacture contemplated include semiconductor wafer handling devices, vacuum chucks, electrostatic chucks, air bearing housings or support frames, electronic packages and substrates, machine tool bridges and bases, mirror substrates, mirror stages and flat panel display setters.

SUMMARY OF THE INVENTION

It is an object of the instant invention to produce a composite material that is lightweight, stiff, strong and substantially pore-free.

It is an object of the instant invention to produce a composite material that has utility in precision equipment and nuclear power applications.

It is an object of the instant invention to produce a composite material by a reaction-bonding process that features a significant fraction of boron carbide.

It is an object of the instant invention to produce a reaction-bonded boron carbide composite material in which chemical reaction of the boron carbide phase with the molten silicon infiltrant during processing is attenuated or suppressed.

It is an object of the instant invention to produce a reaction-bonded boron carbide composite material that, due to attenuation or chemical reaction between boron carbide and silicon, features a smaller or finer grain size of the boron carbide phase than would be possible absent the diminution in chemical reaction.

It is an object of the instant invention to produce a ballistic armor whose ballistic performance at least approaches that of commercially available ceramic armors such as alumina or hot pressed boron carbide.

It is an object of the instant invention to produce a ballistic armor less expensively than hot pressed ceramic armors.

These objects and other desirable attributes can be achieved through the application and engineering of silicon carbide composite bodies, preferably produced by a reactive infiltration technique. According to the instant invention, a molten infiltrant containing silicon and one or more sources of boron is contacted to a porous mass that contains at least some boron carbide, and also containing at least some free carbon. The molten infiltrant infiltrates the porous mass without a pressure or vacuum assist to form a composite body of near theoretical density. The silicon component of the infiltrant reacts with the free carbon in the porous mass to form in-situ silicon carbide as a matrix phase. Further, the tendency of the molten silicon to react with the boron carbide component can be suppressed or at least greatly attenuated by the alloying or doping of the silicon with the boron source. The resulting composite body thus comprises boron carbide dispersed or distributed throughout the silicon carbide matrix. Typically, some residual, unreacted infiltrant phase containing silicon and boron is also present and similarly distributed or interspersed throughout the matrix. Thus, these composite materials may be referred to in shorthand notation as $Si/SiC/B_4C$.

Reaction formed silicon carbide composites featuring a boron carbide reinforcement possess stiffness (e.g., elastic or Young's Modulus) comparable to their counterparts featuring the usual silicon carbide reinforcement, but exhibit a lower specific gravity for the same volumetric filler loading. Accordingly, such $B_4C$ reinforced SiC composites will find utility in applications requiring low mass and high stiffness, such as equipment requiring precise motion control, often at high accelerations. Further, because of the extreme hardness and low specific gravity of boron carbide, such composites are attractive armor material candidates.

In the armor embodiment in particular, the instant inventors have discovered that a very desirable armor material can be produced when the known hardness requirement is combined with a relatively fine-grained microstructure, the latter of which is made possible by the supression of the boron carbide reaction.

DEFINITIONS

"Areal Density", as used herein, means the mass of an armor system per unit area.

"Ballistic stopping power", as used herein, means the $V_{50}$ projectile velocity per unit of total areal density.

"Fine-grained", as used herein, means that the morphological features making up the microstructure of the reaction-bonded silicon carbide bodies of the instant invention are smaller than the microstructural features of much of the reaction-bonded silicon carbide presently on the market. Preferably, the microstructure of the instant reaction-bonded silicon carbide bodies is engineered such that the vast majority of morphological features do not exceed about 100 microns in size.

"Free Carbon", as used herein, means carbon that is intended to react with molten silicon to form silicon carbide. This term usually referees to carbon in elemental form, but is not necessarily limited to the elemental carbon form.

"Inert Atmosphere", as used herein, means an atmosphere that is substantially non-reactive with the infiltrant or the porous mass or preform to be infiltrated. Accordingly, this definition includes gaseous constituents that might otherwise be thought of as mildly reducing or mildly oxidizing. For example, forming gas, comprising about 4 percent hydrogen, balance nitrogen, might be considered to be an inert atmosphere for purposes of the present disclosure, as long as the hydrogen does not reduce the filler material and as long as the nitrogen does not appreciably oxidize the infiltrant or filler material.

"Mass Efficiency", as used herein, means the areal density of rolled homogeneous steel armor required to give the same ballistic performance as that of the targets being tested, expressed as a ratio.

"Reaction Bonded Silicon Carbide", or "RBSC", refers to a ceramic composite body produced by reaction-bonding, reaction-forming, reactive infiltration, or self-bonding.

"Reaction-Bonded Boron Carbide", or "RBBC", as used herein, means a class or subset of reaction-bonded silicon carbide composites in which the filler or reinforcement of the composite, i.e., the phase being bonded, includes boron carbide.

"Reaction-Bonding", "Reaction-Forming", "Reactive Infiltration" or "Self-Bonding", as used herein, means the infiltration of a porous mass comprising carbon in a form that is available to react with an infiltrant comprising silicon to produce a ceramic composite body comprising at least some silicon carbide produced in-situ.

"Total areal density", as used herein, means the areal density of ceramic armor material plus the areal density of any other material that should properly be considered a part of the assembly of components making up an armor system. Examples of other materials would be fiber reinforced polymeric materials frequently used to back up or encase a ceramic armor plate.

DETAILED DESCRIPTION OF THE INVENTION AND PREFERRED EMBODIMENTS

Figure 1:
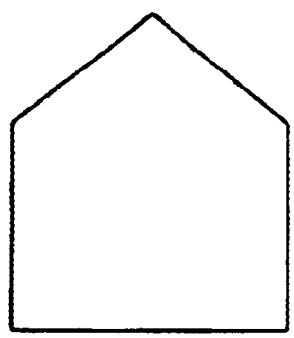
FIG. 1 is a cross-sectional view of a feeder rail as described in Example 1.

In accordance with the present invention, a substantially pore-free, mechanically strong composite material is produced that comprises boron carbide, preferably in a large volume fraction or combined with one or more exceptionally hard, stiff materials such as silicon carbide to yield a large fraction of very hard, very stiff phase. Furthermore, through careful control of the processing conditions, e.g., to suppress reaction of the boron carbide phase, a superior material can be produced, particularly a superior armor product. In addition, the composite bodies produced according to the present invention maintain dimensional tolerances upon thermal processing better than do hot pressed and sintered bodies.

As stated above, silicon carbide and boron carbide, two candidate materials having very desirable hardness for certain applications envisioned by the instant invention, are difficult to fully densify by traditional approaches such as by sintering. Such materials are amenable to hot pressing, but hot pressing has its drawbacks, for example, its expense and limitations of the possible geometries that can be produced without extensive machining.

Thus, for economy and manufacturing flexibility, among other reasons, the composite bodies of the instant invention are produced by a reactive infiltration technique, usually termed "reaction forming" or "reaction bonding", whereby a molten infiltrant comprising silicon is contacted to a porous mass comprising carbon and at least one hard ceramic material that includes boron carbide. The molten silicon-based material infiltrates the interconnected porosity in the porous mass or preform. The molten silicon contains one or more sources of boron in a quantity sufficient to attenuate the tendency of the boron carbide component to chemically react with the molten silicon. Concurrent with the infiltration, the silicon reacts with the carbon in the porous mass or preform to form silicon carbide. The amount of infiltrant is generally provided in such a quantity that the carbon in the porous mass or preform is completely reacted to silicon carbide, with sufficient additional infiltrant supplied to fill any remaining void space between the filler material and the in-situ silicon carbide. The resulting composite materials feature a matrix of the in-situ silicon carbide. Dispersed throughout the matrix is the filler and residual, unreacted infiltrant material. As the residual infiltrant is often interconnected, it is sometimes considered as part of the matrix of the composite.

In terms of the preferred processing conditions, atmospheres that are compatible with this type of infiltration include vacuum or inert atmospheres such as argon, although vacuum is preferred. The vacuum does not have to be "hard" or high vacuum; that provided by a mechanical "roughing" pump is entirely adequate. Although the infiltration tends to be more robust at the higher temperatures, it is also more aggressive, which could give rise to unwanted side reactions, particularly of the boron carbide component. Further, it is more difficult to confine the infiltrant spatially at higher temperatures. Moreover, higher processing temperatures are more likely to give rise to exaggerated grain growth. For all of these reasons, the preferred processing temperatures are those that are generally low yet consistent with reliable infiltration. For infiltrating silicon-based metals into a boron carbide-containing particulate mass in a rough vacuum environment, temperatures in the range of about 1450° C. to 1600° C. should be satisfactory.

Boron carbide is an especially attractive filler material candidate where the mass of the article is of concern because of its low theoretical density of about 2.45 to 2.55 grams per cubic centimeter. (The range in reported theoretical density may be due to the fact that boron carbide is not a line compound per se, but instead exhibits a limited range of stoichiometry.) Because the Young's Modulus of boron carbide is comparable to that of silicon carbide (about 450 GPa), boron carbide has a higher specific stiffness than does silicon carbide. High specific stiffness is a valuable property in applications such as those requiring precise motion and control of motion, especially where large loads or high accelerations are involved. Moreover, boron carbide is even harder than silicon carbide. Thus, a RBSC composite body featuring boron carbide as a reinforcement or filler material (i.e., "RBBC") may offer higher hardness yet lower specific gravity as compared to a RBSC composite having silicon carbide as the filler material.

Under most of the prior silicon infiltration conditions, however, boron carbide is at least somewhat reactive with the molten silicon. Although one reaction product of such reaction is more in situ silicon carbide, where one is attempting to maximize the boron carbide loading, it would be desirable if the boron carbide could remain substantially unaffected by the infiltrant, e.g., if the silicon did not react with the boron carbide. The instant invention solves this problem by dissolving some boron into the molten silicon, thereby reducing the activity of the silicon for reaction with boron carbide. Although pure silicon will eventually become saturated in boron and carbon as it reacts with the boron carbide phase in the porous mass or preform, this approach is not preferred, unless this porous mass or preform is "sacrificial", and not the ultimate article of commerce being produced. In many instances, reaction of the boron carbide reinforcement with the silicon infiltrant has led to cracking of the resulting silicon carbide composite body. Instead, what is preferred is to provide a source of boron to the silicon-based infiltrant prior to the infiltrant making contact with the boron carbide in the porous mass or preform. Any boron-containing substance that can be dissolved in silicon may be useful in the context of the instant invention; however, elemental boron and boron carbide are particularly preferred.

One can envision any number of techniques for adding a boron source material to the silicon infiltrant. The approach preferred according to the instant invention is to support the preform to be infiltrated on, and to feed the infiltrant into the preform by way of, kiln furniture consisting of a porous preform comprising boron carbide. Specifically, a silicon-containing infiltrant can infiltrate kiln furniture (later referred to as a "feeder rail" or "beam") containing at least some boron carbide. The kiln furniture may be provided in either the porous condition, e.g., as a preform; or in the "already infiltrated" condition, e.g., as a composite body. The preform that ultimately is intended to become an article of commerce upon infiltration, sometime referred to as the "object" preform, is supported on the kiln furniture. The silicon-containing infiltrant dissolves at least some of the boron carbide of the kiln furniture, and may even become saturated with carbon and/or boron. When this molten silicon then continues to infiltrate into the object preform that is in contact with the kiln furniture, the infiltrating silicon will react very little if at all with the boron carbide in the object preform. Any cracking of the kiln furniture as a consequence of silicon reacting with the boron carbide in the kiln furniture should not unduly affect the continued infiltration of the silicon into the object preform. Of course, the supporting kiln furniture is not required to contain boron carbide per se. Many boron-containing substances in which the boron is able to dissolve in the silicon component of the infiltrant should be satisfactory; however, substances such as boron oxide may not be sufficiently refractory under the thermal processing conditions. Further, the boron source is not required to be located in the kiln furniture; it may be alloyed or otherwise introduced into the silicon component of the infiltrant at most any point prior to the silicon making contact with the boron carbide of the object preform. For example, the instant inventors have found it useful when building the "lay-up" for infiltration to supply boron carbide particulate to the bottom of the vessel housing the molten silicon infiltrant, dispersed, for example, as loose powder between the feeder rails. Moreover, the inventors have noticed that the presence of a boron nitride coating on the porous mass or preform to be infiltrated also helps suppress the boron carbide reaction.

A preferred embodiment of the instant invention relates to the specific application of the instant RBBC materials as armor for stopping ballistic projectiles. To defeat the incoming projectile, such ceramic armors usually feature at least two layers made up of very dissimilar materials. Namely, at a minimum, there is a ceramic layer and a backing layer, which typically are bonded to one another. As the name suggests, relative to the direction of travel of the projectile, the backing layer is placed behind the ceramic layer. Sometimes, one or more layers of a protective material are also placed in front of the ceramic layer, but these are usually for the purpose of protecting the ceramic from fractures due to routine handling (or mishandling). The purpose of the ceramic layer is to "process" the projectile, such as by flattening or shattering it. The role of the backing layer is to then "catch" the processed projectile as well as any backward propelled fragments of the ceramic layer. The backing layer may be made of metals such as aluminum, steel or titanium, which for vehicular armor, may be the structure of the vehicle itself. Where lightweight armor is needed, the backing layer typically is a fiber-reinforced polymeric (FRP) material. The fibers employed in these backing layers include polyethylene, aramid and glass fibers. Several such FRP backing materials are commercially available. One such FRP backing material goes by the tradename "SpectraShield", registered to AlliedSignal Inc. (now owned by Honeywell International Inc., and referring to a roll product consisting of two plies of unidirectional extended-chain polyethylene fiber tapes cross-plied at right angles, resulting in a nonwoven, thermoplastic composite).

Armor generally takes the form of a plate, but the plates need not be flat, regular polygons. Often, the armor plates must be shaped to conform to the underlying structure to be protected. Body armor, for example, is often curved in one or more dimensions to better conform to the shape of the wearer, e.g., conform to a human torso.

According to many who are skilled in the armor arts, what is sought in the way of an armor material is one that fractures and erodes the impacting projectile before it can penetrate the armor material. Viechnicki et al. (ibid.) have shown that all that is required in terms of hardness is for the armor to have at least the same hardness as the projectile, but that further increases in hardness over the required "threshold" level do not add significantly to the performance level.

Accordingly, in addition to the motion control applications alluded to above, boron carbide reinforced RBSC's should be attractive candidate armor materials, and in fact as the prior art shows, others have attempted to apply these ceramic composite materials as armors previously. Because armor is often specified by total weight, armor systems having low bulk density are sought after because the armor can be made thicker for the same mass, the desirability of which was discussed previously. One implication of the extreme hardness of boron carbide is that a greater amount of non-hard phase, e.g., metal, can be tolerated in a composite body comprising boron carbide and metal, for example, to enhance other properties such as strength or toughness, and still meet the overall hardness required of the composite body.

In general, RBSC is cheaper to produce than hot pressed or sintered SiC. Moreover, Si has a lower specific gravity than SiC; therefore, a RBSC composite containing some residual Si will have a lower specific gravity than monolithic SiC. Further, the specific gravity of RBSC is substantially less than that of alumina, a standard ceramic armor material. Accordingly, the economics and the prospect of reduced specific gravity provided sufficient incentive for the instant inventors to re-visit RBSC as a candidate armor material, and to try to engineer it to overcome its reported deficiencies as armor.

The hardness of the composite is proportional to the volume fraction of hard phases such as silicon carbide or boron carbide making up the composite material. One technique for maximizing the amount of hard phase in the composite body is to produce a preform that is highly loaded volumetrically in the hard phases. Highly loaded preforms can be produced by utilizing a distribution of filler material particle sizes sufficiently wide so that small particles can nest or fit within the interstices of larger particles. Because these two parameters of maximizing the loading of hard fillers in the preform while capping or limiting the size of the largest particles inherently are at odds with one another, careful attention to processing parameters is required to achieve both in the same material. Fortunately, the instant inventors have been relatively successful in attaining preforms highly loaded in hard filler while limiting the size of the filler bodies in such a way that, for example, at least 90 percent by volume are smaller than about 100 microns in diameter. Even with this upper limit on the size of the largest particles, it is still possible to produce preforms that are 65 volume percent or more loaded in hard ceramic phases such as $B_4C$.

In terms of developing a high-performing armor material, the instant invention focuses on achieving a sufficiently high volumetric loading of the hard ceramic phases, particularly the $B_4C$ phase, as to meet overall hardness levels believed to be important, and then on limiting the size of the largest grains or crystals making up the composite body. Although sometimes referred to as a "fine-grained RBSC material", what is really meant is that the morphological features making up the material, or at least 90 volume percent of these grains or crystals should not exceed about 100 microns in size. Such an upper limit to the particle size can be achieved, among other techniques, by sieving appropriately sized filler particles through a 170 mesh or 200 mesh (U.S. Standard) screen, which yields particles having a maximum size of about 90 microns and 75 microns, respectively. Even more preferred is RBSC having at least 90 volume percent of its morphological features being no greater than about 55 microns in size. As will be seen in some of the Examples to follow, substantially all filler particles are less than about 45 microns.

Some of the "larger" hard ceramic fillers used in the Examples to follow have the following particle size distributions: Grade F240 CRYSTOLON® SiC (Saint-Gobain/Norton Industrial Ceramics, Worcester, Mass.) has 90 percent by volume of all of its constituent particles being smaller than about 55 microns, and 97 percent smaller than about 70 microns. Grade F320 CRYSTOLON® SiC has 90 volume percent of its particles being smaller than about 37 microns, and 97 percent finer than about 49 microns. These results were calculated based on the Eppendorf-Photosedimentometer. According to sieve analysis, 220 grit TETRABOR® $B_4C$ (ESK, Kempten, Germany) has 85 volume percent of its particles being smaller than about 75 microns, and substantially all of its constituent particles being smaller than about 106 microns.

It may be that the relatively fine grain size that functions so well in the instant invention is really a proxy for high mechanical strength. Because fine grain size is a necessary but not a sufficient condition for achieving high strength in brittle materials, achieving a high strength target traditionally has been taken as something of a metric for the quality of the ceramic or composite body produced. With composite materials in general and composite materials produced by infiltration in particular, a number of defects can seriously impair the mechanical strength of the resulting composite body. These include non-uniform filler material distribution in the preform, incomplete infiltration of the preform, e.g., leaving porosity and/or unreacted carbon or other reactants in the preform, and excessive grain growth during thermal processing, either of the filler material or of the silicon carbide produced in situ. Such defects probably would also impair the anti-ballistic performance of the material.

On the other hand, if the fracture of the ceramic armor body resulting from a ballistic impact is dependent upon the size of the crystallites making up the armor body, perhaps the instant fined-grained RBSC's fracture in a different mode (e.g., transgranular versus intergranular) than do RBSC's having larger microstructural features.

Whatever the exact reason or operative mechanism, the instant inventors have discovered that fine-grained RBSC materials are very effective at stopping ballistic projectiles.

Because the in-situ-formed silicon carbide component of the ceramic composite bodies of the present invention is so much harder than the silicon component (Vickers Hardness of about 2500 kg/mm$^2$ versus about 1100 kg/mm$^2$, respectively), the overall hardness of the reaction-formed body is strongly dependent upon the relative amounts of each phase. Thus, when the end-use article of the instant composite material is a ballistic armor, it may be important that the composite body contain a large volume fraction of the hard phase(s). Thus, it is possible to form a composite body that is highly loaded in silicon carbide by infiltrating silicon into a porous mass containing large amounts of carbon. For reasons that will be discussed in more detail below, this approach is not preferred. Instead, what is desired is to reactively infiltrate a porous mass or preform that is already highly loaded with the hard ceramic phase(s) of the filler material(s).

Theoretically, when the porous mass or preform comprises boron carbide, no additional carbon source is required to produce silicon carbide, because the silicon of the molten infiltrant will react with the boron carbide. When the objective is to maximize hardness of the resulting composite body, for example, this approach may be undesirable. Specifically, boron carbide has a higher hardness and lower specific gravity than does silicon carbide. Thus, reaction of boron carbide with silicon to produce silicon carbide (plus silicon borides) trades a substance of high hardness for a substance of lower hardness and higher specific gravity. Accordingly, one may want to minimize the reaction of the boron carbide component. Thus, where boron carbide is to be used as a filler material in a RBSC body where high hardness and low specific gravity of the body are desired, as they are in armor systems, a source of carbon other than the boron carbide should be present in the porous mass or preform.

Techniques for maximizing the volumetric loading of filler materials in the porous mass or preform are well known, and usually take the form of blending a plurality of filler material bodies, for example, particles, having a distribution of sizes in such a way that smaller particles tend to fill the interstices between larger particles. There are limits to the size distribution, however, because at some point, large-sized filler material particles will begin to reduce the strength of a composite body that fails by a brittle fracture mechanism due to the introduction of critical-sized flaws into the material. Further, whether it is strength-related or not, there is anecdotal evidence in the prior art that RBSC bodies containing large or relatively large grains were not superior armor materials. Accordingly, the instant invention overcomes this problem by providing a technique whereby the relatively fine boron carbide particles can be infiltrated in a reaction-bonding operation, and not be consumed in a reaction with the incoming silicon infiltrant. The ability to make a fine-grained RBBC is not only beneficial for armor applications, but also for many precision equipment applications. Specifically, while the higher strengths afforded by the fine grain size composite material may not be essential, the fine grain size permits finer features to be ground or machined into the material.

Although most any of the known techniques may be employed to produce a porous preform that can be infiltrated by a molten infiltrant comprising silicon, the techniques that seem to be better able at producing preforms that are highly loaded with one or more fillers are those that utilize a liquid phase, for example, sediment casting, slip casting or thixotropic casting.

Again, the porous mass of the instant invention always contains some amount of boron carbide. In the absence of proactive techniques such as doping of the silicon infiltrant with a source of boron, the boron carbide phase will tend to react with the molten silicon to produce siliocn carbide plus borides of silicon. In the instant invention, the system has been designed such that the boron carbide does not react to any great degree with the molten siliocn. Thus, the boron carbide phase can be considered to be a substantially inert filler material. In addition to the boron carbide, the porous mass can incorporate one or more other such filler materials. By this is meant a filler material that is substantially non-reactive with the molten infiltrant under the local processing conditions. One such filler material that is especially preferred is silicon carbide, as molten silicon more easily wets silicon carbide than other inert materials, such as oxides. However, it should be possible to admix at least some amount of other filler materials that may not be as wettable as boron carbide or silicon carbide under the local processing conditions and still achieve wetting and infiltration of the overall porous mass by the molten silicon. Examples of such alternative filler materials include titanium diboride, silicon nitride and aluminum nitride.

The filler material making up the porous mass to be infiltrated may be provided in a number of different morphologies, including particulates, platelets, flakes, whiskers, continuous fibers, microspheres, aggregate, etc. Particulates are often preferred for reasons of economy and availability.

While not possible through visual inspection, it is possible using diffraction techniques to distinguish the silicon carbide matrix that is reaction-formed from any silicon carbide that may be present as a reinforcement or filler material. Specifically, the reaction-formed silicon carbide typically is of the beta polymorph, at least under the instant processing conditions. In contrast, most commercially available silicon carbide, particularly the commodity grades, is the alpha form that is so commonly used as a filler material. Accordingly, one can provide at least approximate quantitative data as to the relative amounts of each that are present in the composite body.

A wide range of sizes of filler material bodies can be successfully infiltrated using the reaction-forming process, e.g., bodies ranging from several millimeters in size down to bodies on the order of a micron in size. Again, when the goal is to produce a ballistic armor that is competitive with hot pressed armors, the filler bodies should not be permitted to get much larger than about 100 microns in size.

In addition to keeping the starting size of the filler relatively fine, the porous mass of filler material should not be exposed to excessive temperatures, especially during infiltration. In this regard, the instant inventors have successfully infiltrated a porous mass of boron carbide particulate at a temperature of about 1550C. without causing reaction of the boron carbide with the boron-doped silicon infiltrant.

Moreover, a high volume fraction of hard phase(s) should not be accomplished through production of large amounts of the in-situ silicon carbide phase, but instead through the engineering of highly loaded masses of the filler material. For example, the porous mass to be infiltrated preferably contains free or elemental carbon as the carbon source to form the in-situ silicon carbide. The amount of this free carbon should be limited to (generally) no more than about 10 percent by volume of the porous mass, and preferably, no more than about 5 or 6 percent. Thus, in general, the amount of silicon carbide produced in-situ should be limited to no more than about 24 volume percent of the final composite body. Among the problems that result from excessive reaction during the infiltration process are temperature spikes due to the exothermic nature of the chemical reaction of silicon and carbon. Such temperature spikes can cause cracking due to localized thermal expansion. Also, the conversion of elemental carbon to silicon carbide entails a volumetric expansion of about 2.35 times. Thus, large amounts of reaction are also detrimental from the standpoint that the large volumetric change can also lead to cracking.

Although not required, the carbon source added to the porous mass or preform usually takes the form of elemental carbon, such as graphite. For many applications, particularly those requiring high stiffness, it is desirable that the silicon carbide of the resulting composite body be at least partially interconnected. This outcome is more readily achieved if the carbon in the porous mass or preform is interconnected. Further, interconnected carbon in the porous mass or preform assists the infiltration process in terms of speed and reliability. In a preferred embodiment, the carbon is introduced to the porous mass as a resin. This mixture may then be molded to the desired shape. Curing the resin renders the porous mass self-supporting, e.g., as a preform. During subsequent thermal processing, or during an intervening firing step, typically in a non-oxidizing atmosphere, the resin pyrolyzes to carbon in interconnected form to yield a preform containing at least about 1 percent by volume of carbon. The resin infiltration and pyrolysis cycle may be repeated one or more times if an increase in the carbon content is needed.

Reaction-bonded silicon carbide composite bodies are generally cheaper to manufacture than hot pressed silicon carbide bodies. Not only may a plurality of RBSC bodies be thermally processed simultaneously, but the tooling (typically graphite) lasts longer than that used in hot pressing operations.

As mentioned previously, the present RBSC composite materials can be produced to net size and shape better than hot pressed or sintered ceramic armor bodies, as expressed or measured by the achievement of precise net dimensional tolerances. In high volume production in particular, a curved ceramic armor plate measuring about 12×9×0.18 inch (30× 23×0.46 cm) and made from SiC-filled RBSC material typically can be made to a three-sigma (three standard deviations) value for thickness of about 10 to 12 mils (250 to 300 microns). Normalized to the mean thickness, this three-sigma reproducibility value works out to about 5.4 to 6.5 percent. In contrast, a hot-pressed boron carbide curved tile having substantially the same length and width dimensions but being slightly thicker at about 0.27 inch (0.69 cm) typically exhibits a three-sigma thickness value of about 30 mils (760 microns). The instant inventors also expect the instant RBBC materials to show better dimensional reproducibility than hot pressed boron carbide.

The tighter dimensional tolerances represent a performance advantage. Specifically, production armor, especially armor for weight-sensitive applications, typically is warranted or certified to some minimum ballistic protection level as measured by a $V_{50}$ projectile velocity number at a specified maximum weight or areal density. (As a point of information, the ballistic test terminology in this patent document has the same meaning as the same terminology found in MIL-STD-662F.) Because the objective is high ballistic performance and low areal density, both of which parameters are related to thickness but varying oppositely of one another, one wants as uniform a thickness of the armor plate as possible. This is especially true in view of the fact that the $V_{50}$ value must be achieved at the lower limit of the permissible thickness range, i.e., the thinnest permissible plate, while the maximum weight is determined by the upper limit of the thickness range.

As long as the overall shape of a ceramic armor plate is within specifications, it is at least theoretically possible to restore non-uniformities developed during thermal processing by means of grinding or machining. Such postprocessing operations, however, are usually expensive and rarely are they commercially viable in the body armor market. Accordingly, the ceramic armor body should have uniform thickness in the as-thermally processed condition.

Conformity of the shape of the formed ceramic armor body to the intended shape is also important. The ability to make ceramic armor plates having complex shaped curves that faithfully reproduce the desired shape can have significant value in meeting the form and fit requirements of the armor product. The SiC-filled RBSC materials, exhibiting better thickness uniformity than sintered or hot pressed armor ceramics, are also expected to exhibit better shape fidelity than the sintered or hot pressed product. Similar results are expected for the RBBC material.

The following non-limiting examples further illustrate the instant invention.

EXAMPLE 1

This example demonstrates the production via reactive infiltration of a Si/SiC composite body containing a boron carbide reinforcement, i.e., Si/SiC/$B_4C$. More specifically, this Example demonstrates the infiltration of a silicon-containing melt into a preform containing an interconnected carbon phase derived from a resinous precursor, and silicon carbide and boron carbide particulates.

Preforms were prepared by a sedimentation casting process. Specifically, about 28 parts of water were added to 100 parts of ceramic particulate and 8 parts of KRYSTAR 300 crystalline fructose (A. E. Staley Manufacturing Co.) to make a slurry. The ceramic particulate content consisted of about equal weight fractions of 220 grit TETRABOR® boron carbide (ESK GmbH, Kempten, Germany, distributed by MicroAbrasives Corp., Westfield, Mass.) having a median particle size of about 66 microns and 500 grit CRYSTOLON green silicon carbide (St. Gobain/Norton Industrial Ceramics) having a median particle size of about 13 microns (Grade 500 RG). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant (Sil-Clean, Plastic Tooling Supply Co., Exton, Pa.). The wetted rubber mold was then placed onto the graphite plate and allowed to dry. The slurry was poured into the cavity. Vibration was commenced.

The residual liquid on the top of the casting was blotted up with a sponge periodically during sedimentation. After the particulates had fully settled (about 3 hours), vibration was halted. The graphite plate, the rubber mold and the castings inside were transferred from the vibration table to a freezer maintained at a temperature of about minus 20° C. The casting was thoroughly frozen in about 6 hours, thereby forming a self-supporting preform.

From the freezer, the frozen preform was demolded and placed onto a graphite setter tray. The graphite tray and preform were then immediately placed into a nitrogen atmosphere furnace at ambient temperature. The furnace was energized and programmed to heat to a temperature of about 50° C. at a rate of about 10° C. per hour, to hold at about 50° C. for about 8 hours, then to heat to a temperature of about 90° C. at a rate of about 10° C. per hour, to hold at about 90° C. for about 8 hours, then to heat to a temperature of about 120° C. at a rate of about 10° C. per hour, to hold at about 120° C. for about 4 hours, then to heat to a temperature of about 600° C. at a rate of about 50° C. per hour, to hold at about 600° C. for about 2 hours, then to cool down to about ambient temperature at a rate of about 100° C. per hour. This firing operation pyrolyzed the fructose, yielding a well-bonded preform containing about 2.7 percent by weight carbon.

The above-mentioned steps were employed to produce two "beam" or feeder rail preforms and a number of tile preforms. Each tile preform had a mass of about 174 grams and had overall dimensions of about 100 mm square by about 9 mm thick. Each rail preform had a cross-section as depicted in FIG. 1 and measured about 220 mm long by about 15 mm wide by about 25 mm thick. During infiltration of the tile preforms, these rails would serve as a conduit for conducting molten infiltrant toward and into the tile preforms.

Next, a set-up to confine the infiltration process was prepared.

Figure 2A:
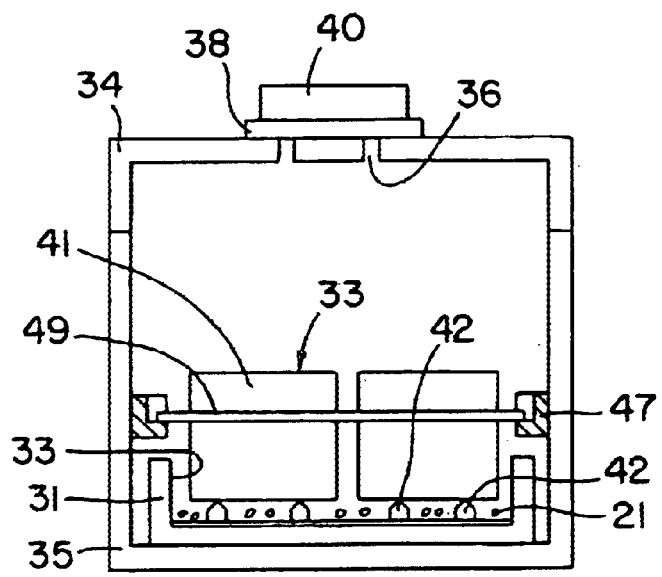
FIGS. 2A and 2B are front and side views, respectively, of a set-up used to prepare the boron carbide reinforced silicon carbide composite tiles of Example 1.
Figure 2B:
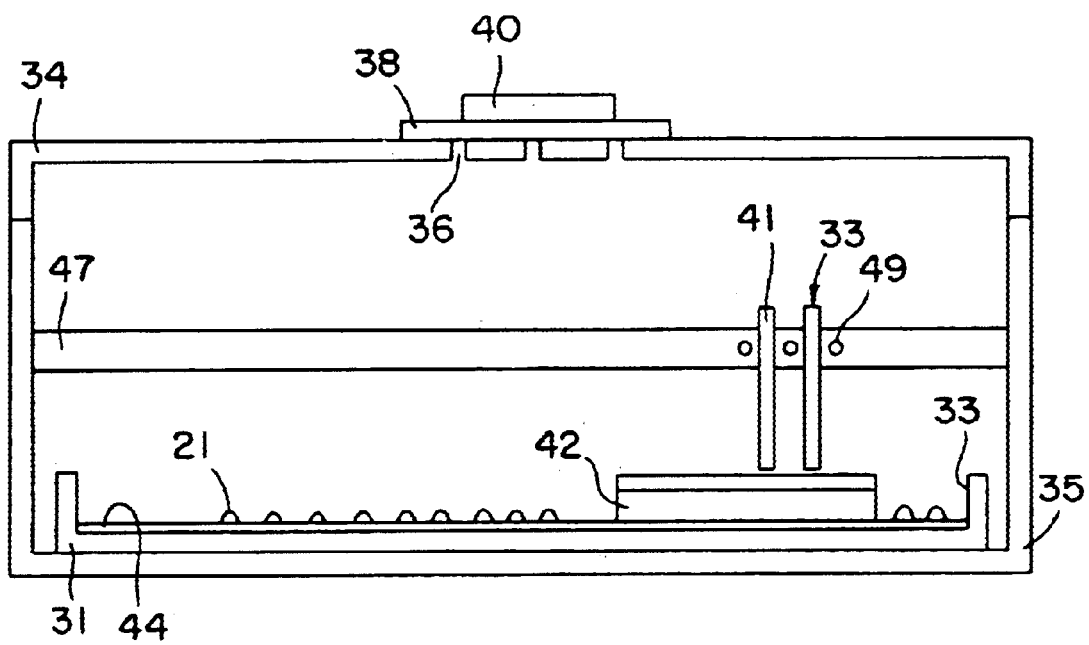

Referring to FIGS. 2A and 2B, the interior surfaces of a Grade ATJ graphite tray 31 (Union Carbide Corp., Carbon Products Div., Cleveland, Ohio) measuring about 790 mm by about 230 mm by about 51 mm deep were spray coated with a boron nitride slurry or paint 33 using a Model 95 Binks spray gun. The boron nitride paint was prepared by diluting about 1800 grams of LUBRICOAT boron nitride paste (ZYP Coatings, Oak Ridge, Tenn.) with deionized water to a volume of about 1 gallon (3.7 liters). Two relatively light coats of this boron nitride paint were applied, with brief ambient temperature drying in air between coats.

The boron nitride-coated tray was then placed into a larger graphite chamber 35 having interior dimensions of about 825 mm long by about 270 mm wide by about 320 mm in height. The chamber also featured means for supporting a parallel row of graphite dowel rods.

Referring now specifically to FIG. 2B, two plies of PANEX®30 low oxidation carbon cloth 44 (Grade PW03, plain weave, 115 g/m², Zoltek Corp., St. Louis, Mo.) weighing about 48 grams and measuring about 790 mm by about 230 mm was placed on the floor of the coated graphite tray 31, 33. Four boron carbide rail preforms 42, each having a mass of about 190 grams and a length of about 200 mm, were placed on top of the cloth and arranged parallel to the length dimension of the tray. Silicon in lump form 21 (Grade LP, Elkem Metals Co., Pittsburgh, Pa.) and comprising by weight about 0.5 percent Fe (max) and the balance Si, was then distributed more or less uniformly over the carbon cloth between the individual preform rails. Calculations showed that about 1510 grams of silicon infiltrant would be required to completely react the elemental carbon and fill the interstices in the cloth, feeder rail preforms and tile preforms; however, about 10% additional silicon was provided to the set-up.

Graphite dowel rods 49 measuring about 0.25 inch (6 mm) in diameter and spray coated with boron nitride 33 were placed into graphite holders or supports 47. A total of fifteen square tile preforms 41 (only four are shown in the Figure) similarly spray coated with boron nitride 33 were placed across the two rails edgewise in each half of the tray. As the boron nitride tended to act as a barrier material hindering over-infiltration, the surface of the tiles that were to contact the boron carbide preform rails were left uncoated.

The top of the chamber was covered with a loose-fitting (non-hermetically sealing) graphite lid 34 featuring a number of approximately 1 cm diameter through-holes 36 to permit atmosphere exchange. The holes were covered with a piece of graphite felt 38 which was held in place with a graphite block 40 which served as a dead load, thereby completing the set-up.

The completed set-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1 hour, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents was recovered from the vacuum furnace, disassembled and inspected. The silicon infiltrant had melted and infiltrated through the carbon cloth, thereby converting the carbon cloth to silicon carbide cloth. The molten silicon infiltrant had also infiltrated through the rail preforms and into the square tile preforms, and reacting with the elemental carbon therein, to form dense, silicon carbide matrix composite bodies having a boron carbide reinforcement. Because each tile preform was supported by the rails in line contact, only low-to-moderate hand force was sufficient to separate the Si/SiC/B$_4$C composite tiles from the feeder rail composite material.

EXAMPLE 2

The technique of Example 1 was substantially repeated, except that no silicon carbide particulate was used in fabricating the preform, and the particle size distribution of the boron carbide was modified such that substantially all particles were smaller than about 45 microns. Following the pyrolysis step, the preforms contained about 75 percent by volume of the boron carbide particulate and about 4 percent by volume of carbon.

Figure 3:
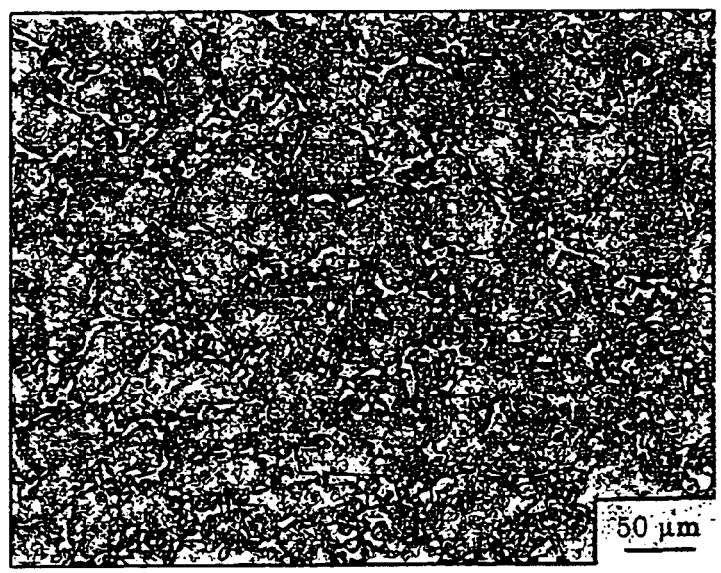
FIG. 3 is an optical photomicrograph of a polished cross-section of the RBBC material produced in accordance with Example 2.

After infiltration, the ceramic material contained nominally 75 vol. % $B_4C$, 9 vol. % reaction-formed SiC, and 16 vol. % remaining Si (i.e., an $Si/SiC/B_4C$ composite). A polished section was examined using a Nikon Microphot-FX optical microscope. An optical photomicrograph of the material is shown in FIG. 3. It is clearly evident that, by careful selection of processing conditions, including addition of a source of boron to the silicon infiltrant, little growth and interlocking of the particles has occurred, thus allowing a relatively fine microstructure to be maintained. For instance, the photomicrograph shows little visible reaction between the Si and $B_4C$ as a result of the infiltration process.

EXAMPLE 3

The technique of Example 2 was substantially repeated, except that, before supplying the silicon infiltrant to the lay-up, a monolayer of TETRABOR® boron carbide particulate (220 grit, ESK) was sprinkled onto the carbon cloth between the feeder rails. The amount of silicon was concomitantly increased to account for the added boron carbide, and to maintain an excess supply of silicon of about 10 percent, as in Example 1.

Comparative Example 1

This example demonstrates the fabrication of a silicon carbide composite armor plate highly loaded in a fine-grained silicon carbide filler. The example furthermore shows the re-use of some of the components of the thermal processing apparatus.

An armor "breastplate" and four "feeder rail" preforms were prepared by a sedimentation casting process. Specifically, about 24 parts of de-ionized water were added to 100 parts of CRYSTOLON green silicon carbide (Saint-Gobain/Norton Industrial Ceramics, Worcester, Mass.) and about 6 parts of KRYSTAR 300 crystalline fructose (A. E. Staley Manufacturing Co., Decatur, Ill.) to make a slurry. The silicon carbide particulate consisted of about 65 parts by weight of Grade F320 (median particle size of about 29 microns, blocky morphology) and the balance Grade 500 RG (median particle size of about 13 microns, rounded morphology). The solids and liquids were added to a plastic jar and roll mixed for about 40 hours. The slurry was de-aired in about 760 mm of vacuum for about 5 minutes. About 15 minutes prior to casting, the slurry was re-roll mixed to suspend any settled particulates.

A graphite support plate was placed onto a vibration table. A rubber mold having a cavity of the desired shape to be cast was wetted with a surfactant consisting of a 10 weight percent aqueous solution of JOY dishwashing detergent (Proctor and Gamble, Cincinnati, Ohio). The wetted rubber mold was then placed onto the graphite plate and allowed to dry. The slurry was poured into the cavity. Vibration was commenced.

After the particulates had fully settled (about 3 hours), vibration was halted. The residual liquid on the top of the casting was blotted up with a sponge. The graphite plate and the castings in the rubber mold thereon were transferred from the vibration table to a freezer maintained at a temperature of about minus 15° C.

Once the casting had frozen thoroughly, the rubber mold was removed from the freezer and the frozen casting contained therein was demolded and placed onto a graphite setter tray for drying and bisque firing. The setter tray was contoured to the shape of the outer face of the breastplate preform. The graphite tray and preform were then placed into a nitrogen atmosphere furnace at ambient temperature. The furnace was energized and programmed to heat to a temperature of about 90° C. at a rate of about 40° C. per hour, then to hold at about 90° C. for about 2 hours, then to further heat to a temperature of about 600° C. at a rate of about 100° C. per hour, to hold at about 600° C. for about 2 hours, then to cool down to about ambient temperature at a rate of about 200° C. per hour. This firing operation pyrolyzed the fructose, yielding a well-bonded preform containing about 2 percent by weight carbon.

The carbon content of the breastplate preform was increased by re-infiltrating with a 70 percent by weight aqueous solution of KRYSTAR 300 crystalline fructose. Specifically, the preform was submerged in the fructose solution for a total of about 20 hours. For about the first 2 hours, an overpressure of about 60 psi (410 kPa) of air was applied to the solution in an effort to force the solution into the preform more quickly. After halting the pressure application for about 15 minutes, it was resumed at the same pressure. After maintaining the overpressure for about another 2 hours, the pressure was let back to ambient and the preform was permitted to soak in the solution for the balance of the 20 hours. The breastplate preform was then removed from the fructose solution and wiped with a damp cloth to remove excess fructose solution. The preform was then re-pyrolyzed according to the same thermal schedule as described above. The second pyrolysis step added about 3 percent to the overall mass of the preform.

The breastplate preform had a mass of about 700 grams and had overall dimensions of about 318 mm long by about 241 mm wide by about 4.4 mm thick. The breastplate was slightly curved in the length and width dimensions. The feeder rail preforms were the same size in terms of cross-section as those used in Example 1 to infiltrate square tile preforms.

A lay-up for infiltration was then prepared.

Figure 4A:
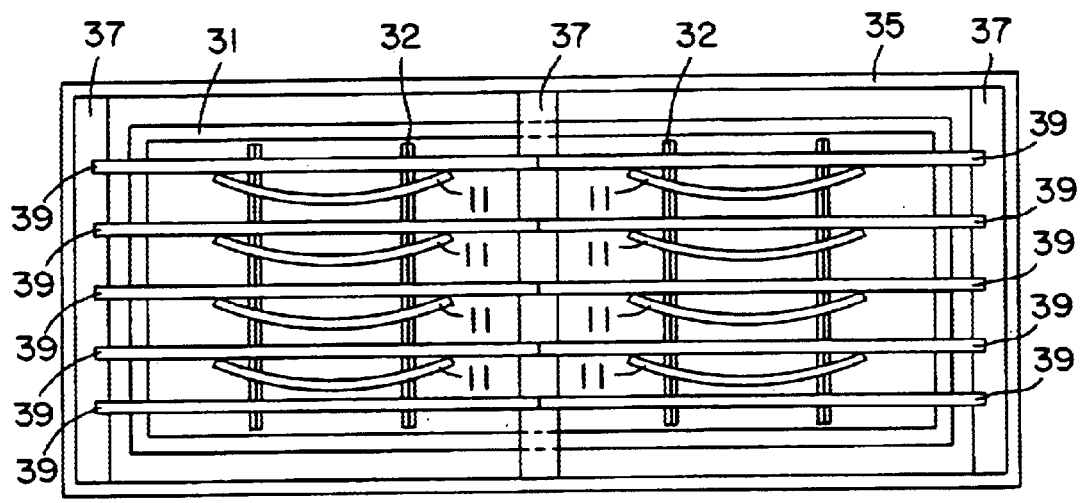
FIGS. 4A and 4B are top and front views, respectively, of a set-up used to prepare silicon carbide composite breastplates according to Comparative Example 1.
Figure 4B:
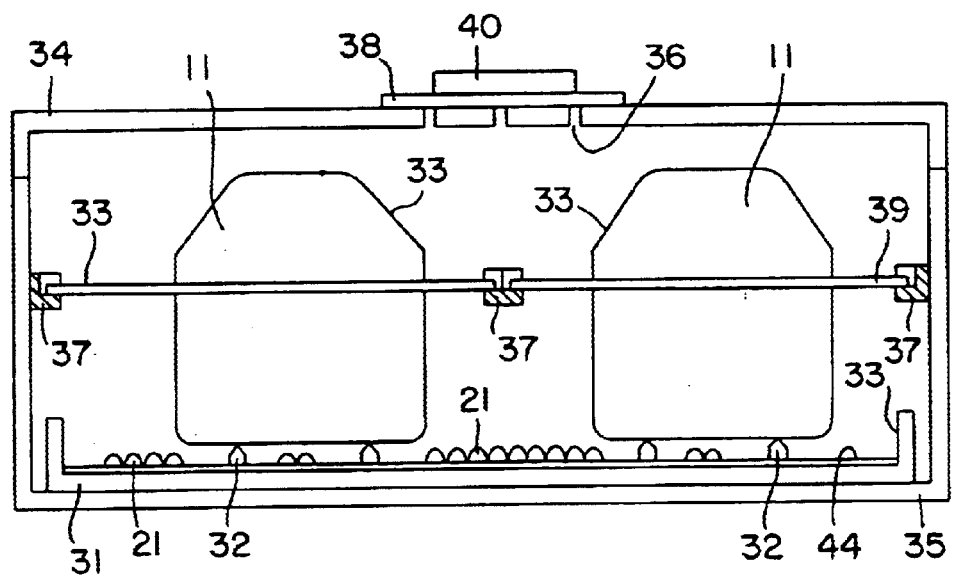

Referring to FIGS. 4A and 4B, the interior surfaces of a Grade ATJ graphite tray 31 (Union Carbide Corp., Carbon Products Div., Cleveland, Ohio) measuring about 790 mm by about 230 mm by about 51 mm deep was spray coated with a boron nitride slurry or paint 33 in substantially the same fashion as was described in Example 1.

The boron nitride-coated tray was then placed into a larger graphite chamber 35 measuring just slightly larger lengthwise and widthwise than the tray, but being of sufficient height to accommodate the long dimension of the armor plate. The chamber also featured means 37 for supporting a parallel array of graphite dowel rods 39.

Infiltration of the Carbon Cloth and Silicon Carbide Feeder Rails

Referring now specifically to FIG. 4B, a single PANEX® 30 low oxidation carbon cloth 44 (Grade PW03, plain weave, 115 g/m², Zoltek Corp., St. Louis, Mo.) weighing about 25 grams and measuring about 790 mm by about 230 mm was placed on the floor of the coated graphite tray 31,33. Four silicon carbide rail preforms 32, each having a mass of about 190 grams, were placed across the width of the cloth 44, and arranged in pairs, one pair on each half of the tray. Sufficient silicon (Grade LP, Elkem Metals Co., Pittsburgh, Pa., lump form) and comprising by weight about 0.5 percent Fe (max) and the balance Si, was spread over the surface of the carbon cloth to ensure complete infiltration of the cloth, rails and any preform resting on the rails. The top of the chamber was covered with a loose-fitting (non-hermetically sealing) graphite lid 34 featuring a number of 1 cm diameter through-holes 36 to permit atmosphere exchange. The holes were covered with a piece of graphite felt 38 which was held in place with a graphite block 40 which served as a dead load, thereby completing the lay-up.

The completed lay-up was then placed into a vacuum furnace at about ambient temperature (e.g., about 20° C.). The air was evacuated using a mechanical roughing pump, and a rough vacuum of less than about 100 millitorr residual pressure was thereafter maintained. The lay-up was then heated from ambient temperature to a temperature of about 1350° C. at a rate of about 200° C. per hour. After maintaining a temperature of about 1350° C. for about 1 hour, the temperature was further increased to a temperature of about 1550° C. at a rate of about 200° C. per hour. After maintaining a temperature of about 1550° C. for about 1.5 hours, the temperature was decreased to a temperature of about 1450° C. at a rate of about 100° C. per hour. Without holding at this temperature, the lay-up temperature was further decreased to a temperature of about 1300° C. at a rate of about 25° C. per hour, which was immediately followed by a cooling at a rate of about 200° C. per hour to approximately ambient temperature.

Following this heating schedule, the chamber and its contents was recovered from the vacuum furnace. The silicon infiltrant had melted and infiltrated through the carbon cloth and the rail preforms, thereby converting the carbon cloth to silicon carbide cloth, and forming dense, silicon carbide composite feeder rails. From gravimetric analysis, it was determined that there was about 770 grams of uninfiltrated silicon remaining pooled on the silicon carbide cloth. The contents of the graphite chamber were then re-used to fabricate silicon carbide composite armor breastplates.

Infiltration of Breastplate Preforms

About another 1775 grams of silicon 21 (Grade LP, Elkem Metals Co., Pittsburgh, Pa.) and comprising by weight about 0.5 percent Fe (max) and the balance Si, was distributed on the silicon carbide fabric between the silicon carbide composite (e.g., infiltrated) rails. Graphite dowel rods 39 measuring about 0.25 inch (6 mm) in diameter and spray coated with boron nitride 33 were placed into graphite holders or supports 37. Four breastplate preforms 11 similarly spray coated with boron nitride 33 were placed across the two rails edgewise in each half of the tray (see FIG. 4A). The surface of each preform contacting the rails was left uncoated. The top of the chamber was covered as previously described to complete the lay-up.

The graphite chamber and its contents were then thermally processed in substantially the same manner as was used to infiltrate the carbon cloth and silicon carbide feeder rail preforms.

Following this heating schedule, the graphite chamber and its contents was recovered from the vacuum furnace and disassembled. The silicon infiltrant had melted, infiltrated through the composite feeder rails and into the armor breastplate preforms to form dense, silicon carbide composite bodies. Because each breastplate was supported by the rails in line contact on its width dimension, only light hand-applied force was required to separate the formed breastplate composite bodies from the feeder rails. Only a light sandblasting was required to remove several nodules of silicon infiltrant that had exuded through certain points in the boron nitride coating on the breastplates.

Comparative Example 2

The technique of Example 2 was substantially repeated, except that silicon carbide particulate was substituted for the boron carbide particulate. As in Example 2, however, the particle size distribution of the silicon carbide blend was such that substantially all particles were smaller than about 45 microns. Following the pyrolysis step, the preforms contained about 75 percent by volume of the silicon carbide particulate and about 4 percent by volume of carbon.

Figure 5:
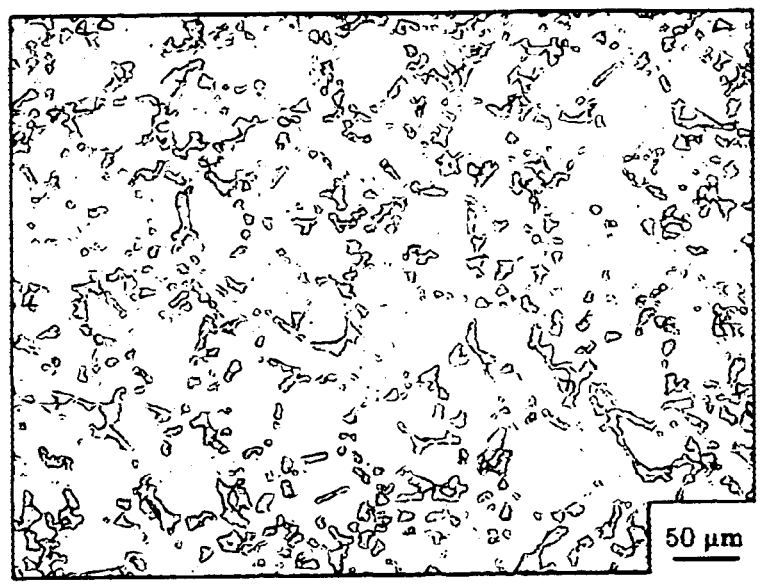
FIG. 5 is an optical photomicrograph of a polished cross-section of the SiC-filled RBSC material produced in accordance with Comparative Example 2.

After infiltration with molten Si, the resultant bodies consisted of 84 vol. % SiC (75 original and 9 reaction formed) and 16 vol. % Si (i.e., an Si/SiC composite). A typical microstructure (optical photomicrograph) of the material is shown in FIG. 5.

In the optical photomicrograph, it is not possible to differentiate between the original SiC and the reaction-formed SiC. As with the reaction bonded $B_4C$ of Example 2, the reaction bonded SiC ceramic shown in FIG. 5 displays little interlocking and clustering of the SiC, thus allowing a relatively fine microstructure to be maintained.

Comparative Example 3

This example demonstrates the production of a composite body by a reactive infiltration process, the composite body featuring a boron carbide reinforcement. The processing was similar as that of Example 1, with the following exceptions.

The carbon cloth and feeder rails were infiltrated first by themselves; a separate thermal processing was employed to simultaneously infiltrate a total of eight tiles from the infiltrated rails. In place of the boron carbide component, the feeder rail preforms featured silicon carbide as the exclusive reinforcement. More precisely, the feeder rail preforms had substantially the same composition as was described in Comparative Example 1. A single ply of carbon cloth was used instead of two plies. For the first infiltration (of cloth and rails) the amount of the silicon infiltrant was somewhat in excess of that quantity calculated as being needed to completely react the elemental carbon and fill the interstices between the reinforcement bodies, e.g., particulate and fiber, making up the rails and cloth. The bodies resulting from this first silicon infiltration were silicon carbide composite cloth and feeder rails. From gravimetric analysis, it was determined that there was about 800 grams of uninfiltrated silicon remaining pooled on the silicon carbide cloth.

For the subsequent thermal processing for infiltrating the eight preform tiles, about 602 grams of the lump silicon 21 (Grade LP, Elkem Metals Co., Pittsburgh, Pa.) was distributed on the silicon carbide fabric between the silicon carbide composite (e.g., infiltrated) rails. Eight preform tiles, boron nitride coated as in Example 1, were placed onto the infiltrated rails and supported with boron nitride coated graphite dowel rods as in Example 1.

For both infiltration runs, the heating schedule was substantially the same as described in Example 1.

Following this second infiltration, the chamber and its contents was recovered from the vacuum furnace. The silicon infiltrant had melted, infiltrated through the silicon carbide composite rails and into the tile preforms to form dense, $Si/SiC/B_4C$ composite bodies. Upon recovery of the infiltrated tiles, it was observed that there was a zone about 1–2 cm in diameter extending from each contact point with each rail up into the tile. These zones were of a slightly different shade than the balance of the infiltrated tile, and each featured a crack about 2 cm long extending from the normal shade/off-shade boundary toward the interior of the composite tile.

Figure 6:
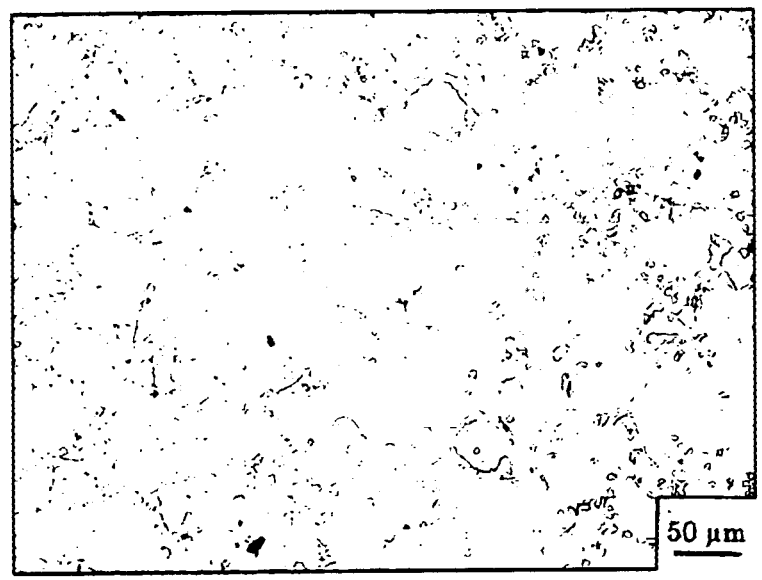
FIG. 6 is an optical photomicrograph of a polished cross-section of the RBBC material produced in accordance with Comparative Example 3.

In FIG. 6, a typical microstructure is shown were Si—$B_4C$ reaction has occurred. Coarsening of the structure (i.e., large ceramic clusters within the Si matrix) is clearly evident. If Si—$B_4C$ reaction is allowed to occur, as was the case in some previous work, the microstructure significantly coarsens. (See for example, the above-referenced U.S. patents to Bailey and to Taylor et al.) A coarse microstructure leads to a ceramic with a larger flaw size, and thus lower strength.

Characterization of Mechanical and Physical Properties

After the fabrication step, various mechanical and physical properties of the instant reaction-bonded ceramic composite materials were measured. Density was determined by the water immersion technique in accordance with ASTM Standard B 311. Elastic properties were measured by an ultrasonic pulse echo technique following ASTM Standard D 2845. Hardness was measured on the Vickers scale with a 2 kg load per ASTM Standard E 92. Flexural strength in four-point bending was determined following MIL-STD-1942A, except for the composite material of Comparative Example 1, where ASTM Procedure No. D790 was used. Fracture toughness was measured using a four-point-bend-chevron-notch technique and a screw-driven Sintech model CITS-2000 universal testing machine under displacement control at a crosshead speed of 1 mm/min. Specimens measuring 6×4.8×50 mm were tested with the loading direction parallel to the 6 mm dimension and with inner and outer loading spans of 20 and 40 mm, respectively. The chevron notch, cut with a 0.3 mm wide diamond blade, has an included angle of 60° and was located at the midlength of each specimen. The dimensions of the specimen were chosen to minimize analytical differences between two calculation methods according to the analyses of Munz et al. (D. G. Munz, J. L. Shannon, and R. T. Bubsey, "Fracture Toughness Calculation from Maximum Load in Four Point Bend Tests of Chevron Notch Specimens," *Int. J. Fracture*, 16 R137–41 (1980))

Results of density, Young's modulus, flexural strength and fracture toughness of the instant reaction-bonded ceramics are provided in Table I. When appropriate, the results are provided as a mean +/− one standard deviation.

TABLE I

| Property | Reaction Bonded SiC | Reaction Bonded $B_4C$ |
|---|---|---|
| Density (kg/m$^3$) | 3060 | 2570 |
| Young's Modulus (GPa) | 384 +/− 2 | 382 +/− 6 |
| Flexural Strength (MPa) | 284 +/− 14 | 278 +/− 14 |
| Fracture Toughness (MPa-m$^{1/2}$) | 3.9 +/− 0.5 | 5.0 +/− 0.4 |

The density of the SiC-based material is about 6% lower than monolithic SiC due to the presence of the Si phase, which has relatively low density. This reduced density is important for applications, such as armor, that are weight specific. The $B_4C$-based material has very low density and is similar to that of monolithic $B_4C$.

The Young's moduli of the reaction bonded SiC and reaction bonded $B_4C$ ceramics are essentially the same, and compare favorably with other high performance ceramic materials. The specific results are as predicted based on the Young's modulus values for dense SiC, $B_4C$ and Si of ~450, ~450 and 120 GPa, respectively. In particular, on a weight specific basis, the reaction bonded $B_4C$ has a very high Young's modulus.

Hardness is a very important parameter for armor materials. Previous work has demonstrated that high mass efficiencies are only obtained versus hard armor piercing projectiles when the projectiles are fractured, and that to effectively fracture the projectile, an armor must have high hardness. (See, for example, M. L. Wilkins, R. L. Landingham, and C. A. Honodel, "Fifth Progress Report of Light Armor Program," Report No. UCRL-50980, University of Calif., Livermore, January 1971; also C. Hsieh, "Ceramic-Faced Aluminum Armor Panel Development Studies," Appendix 9 of Report No. JPL-D-2092, Jet Propulsion Laboratory, February 1985.)

However, it is difficult to compare the many hardness data in the open literature because results can be highly dependent on test method and technique. Therefore, for the instant invention many different commercial materials were obtained. Hardness measurements were then made on both the commercial materials and the new reaction bonded ceramics of the instant invention in an identical manner so that true comparisons could be made. The results are provided in Table II.

TABLE II

| Material | Vickers' Hardness with 2 kg Load (kg/mm$^2$) |
|---|---|
| 7.62 mm M2 AP Bullet (Tool Steel) | 926 +/− 26 |
| 14.5 mm BS-41 Bullet (WC/Co) | 1644 +/− 30 |
| Sintered AlN | 1044 +/− 63 |
| Pure Si | 1243 +/− 21 |
| 90% Sintered $Al_2O_3$ | 1250 +/− 89 |
| Hot Pressed AlN | 1262 +/− 51 |
| 99.5% Sintered $Al_2O_3$ | 1499 +/− 74 |
| Hot Pressed $Al_2O_3$ | 2057 +/− 82 |
| Hot Pressed $TiB_2$ | 2412 +/− 135 |
| Hot Pressed TiC | 2474 +/− 188 |
| Hot Pressed SiC | 2640 +/− 182 |
| Hot Pressed $B_4C$ | 3375 +/− 212 |
| Reaction Bonded SiC | 2228 +/− 274 |
| Reaction Bonded $B_4C$ | 2807 +/− 54 |

The reaction bonded SiC and $B_4C$ ceramics have very high hardnesses that are well in excess of both tool steel and WC/Co projectiles. In both cases, the Si/SiC and Si/SiC/$B_4C$ composites have hardnesses that more-or-less reflect the weighted average hardness of the constituents. In particular, because of the very high hardness of monolithic $B_4C$, the reaction bonded $B_4C$ has a very high hardness value.

Ballistic Testing

A first round of ballistic testing focused on evaluating the SiC-filled RBSC composite material of Comparative Example 1 to a commercially available hot pressed boron carbide. Candidate ceramic armor materials were provided in the form of square tiles measuring about 100 mm on a side. Among the tiles tested were some that were of substantially the same composition as the silicon carbide breastplates of Comparative Example 1.

The Comparative Example 1 ceramic composite material consisted of about 80 percent by volume of silicon carbide, balance silicon. Its bulk density was about 3.0 g/cc, and its Young's Modulus was about 360 GPa. Further, a RBSC body very similar in composition and processing to this Comparative Example 1 material had a four-point flexural strength of about 270 MPa.

To produce an armor target for testing, the ceramic tile is attached to a SpectraShield® polymer composite backing layer (AlliedSignal Inc., Morristown, N.J.). This material is supplied as a 54 inch (1370 mm) wide roll consisting of 2 plies of unidirectional fibers embedded in a resin matrix, with the fibers of one ply being orthogonal to the fibers of the other ply. A number of 12-inch (305 mm) wide sheets were cut from the roll. The appropriate number of these sheets were then laminated and consolidated in an autoclave at an applied pressure of about 150 psi (1.3 MPa) at a temperature of about 121° C. for about 60 minutes, thereby forming a rigid polymer composite plate. Following consolidation, a backing plate measuring about 12 inches (305 mm) square was cut from the 54 by 12 inches (1370 by 305 mm) plate using a band saw or water jet. An approximately 5 inch (120 mm) square region in the center of the backing plate was lightly abraded using 120 grit sandpaper. After cleaning the surfaces to be bonded with isopropyl alcohol, a candidate armor tile was bonded to the center of the backing plate using two plies of 76 microns thick urethane film adhesive. The bond was cured under full vacuum in an oven maintained at a temperature of about 121° C. for about 30 minutes, thereby forming a ballistic test coupon.

The weight of the backing plate was varied according to the number of laminates used; the weight of the ceramic tile was varied according to the thickness dimension to which the ceramic tile was ground. In each instance, however, the total areal density (ceramic tile plus backing material) was maintained at roughly the same amount.

A target for ballistic testing was assembled as follows: The ballistic test coupon was placed in front of 28 plies of KM2 (600 denier) blanket with rip-stop nylon and camouflage cordura covers to simulate the outer tactical vest (OTV) of a body armor. The OTV simulant and test coupon were located in front of a 100 mm thick block of Roma Plastiline modeling clay that had been conditioned at a temperature of about 35° C. for about 6 hours. The test coupon and OTV simulant were secured to the clay block with duct tape, and the clay block was backed up by a steel support structure that was secured to the test table, thereby completing the target.

The targets were shot at zero degrees obliquity using two different types of 7.62 mm projectiles at varying velocities. Table III shows the comparative ballistic test results against the first threat; Table IV reports the results against the other threat. The basic unit of ballistic penetration resistance used in this testing is the $V_{50}$, the velocity of the projectile at which partial penetration and complete penetration of the target are equally likely. Normalizing the $V_{50}$ with respect to the total areal density yields a parameter referred to in this disclosure as "ballistic stopping power".

TABLE III

| Material | Ceramic Areal Dens. (kg/m$^2$) | Backing Areal Dens. (kg/m$^2$) | Calc. $V_{50}$ (m/s) | $V_{50}$ per Unit Total Areal Density (m/kg/s) |
|---|---|---|---|---|
| Comparative Example 1 | 11.48 | 11.83 | 920.2 | 39.5 |
| Hot Pressed B$_4$C | 16.62 | 5.913 | 996.7 | 44.2 |

TABLE IV

| Material | Ceramic Areal Density (kg/m$^2$) | Backing Areal Density (kg/m$^2$) | Calc. $V_{50}$ (m/s) | $V_{50}$ per Unit Total Areal Density (m/kg/s) |
|---|---|---|---|---|
| Comparative Example 1 | 13.78 | 9.480 | 819.3 | 35.2 |
| Hot Pressed B$_4$C | 16.62 | 5.913 | 848.3 | 37.6 |

These results were quite encouraging, and indicated that reaction bonded SiC armor could be made competitive from a performance perspective to some of the leading commercially available (e.g., hot pressed) ceramic armors. Accordingly, the instant inventors continued to pursue development of this approach, leading to the instant boron carbide composite materials.

Ballistic Testing: Round Two

In this second round of ballistic testing, the instant RBBC materials of Example 2 were evaluated as candidate armors, and compared to the SiC-filled RBSC material of Comparative Example 2, as well as to commercial hot pressed B$_4$C (the control). In one series of tests, the reaction bonded SiC and commercial hot pressed B$_4$C were tested versus ball rounds as the ballistic projectile; and in a second set of tests, the reaction bonded B$_4$C and hot pressed B$_4$C were tested versus armor piercing (AP) rounds.

As in the first round of ballistic testing, 100 mm×100 mm ceramic tiles were bonded to 300 mm by 300 mm fiber-reinforced polymer plates.

Ballistic Properties

The results of ballistic testing are provided in Tables V and VI. In Table V, test results versus a 7.62 mm M80 ball round for reaction bonded SiC and commercial hot pressed B$_4$C (control) are provided. In Table VI, test results versus a 7.62 mm AP M2 round for reaction bonded B$_4$C and commercial hot pressed B$_4$C are provided. In each case, the tables provide the areal density of the system, the mass efficiency of the target, and the normalized mass efficiency relative to the hot pressed B$_4$C control. The mass efficiencies in the tables were determined based on available data for rolled homogeneous steel armor (RHA) versus the same threats. Specifically, the mass efficiency was calculated as the areal density of RHA required to give the same performance divided by the areal density of the tested targets.

TABLE V

| | Armor System Areal Density kg/m$^2$ (psf) | Mass Efficiency (RHA Equivalent) | Normalized Mass Efficiency |
|---|---|---|---|
| Hot Pressed B$_4$C (control) | 23.5 (4.82) | 4.56 | 1.00 |
| Reaction Bonded SiC | 23.9 (4.89) | 5.11 | 1.12 |

TABLE VI

| | Armor System Areal Density kg/m² (psf) | Mass Efficiency (RHA Equivalent) | Normalized Mass Efficiency |
|---|---|---|---|
| Hot Pressed B₄C (control) | 29.0 (5.95) | 4.53 | 1.00 |
| Reaction Bonded B₄C | 30.2 (6.18) | 4.85 | 1.07 |

Figure 7A:
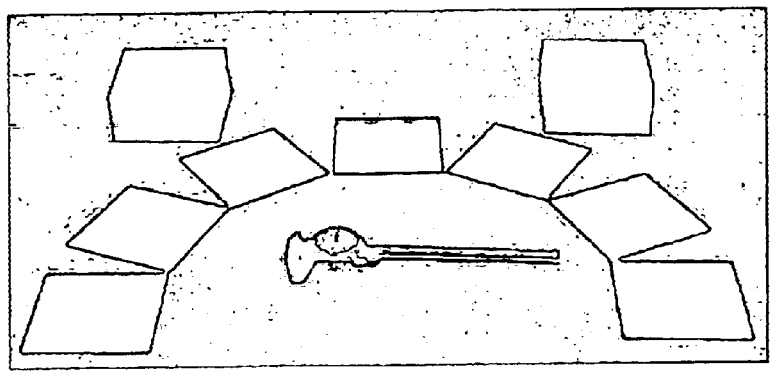
FIGS. 7A–7C illustrate several applications of the armor material embodiment of the instant invention.
Figure 7B:
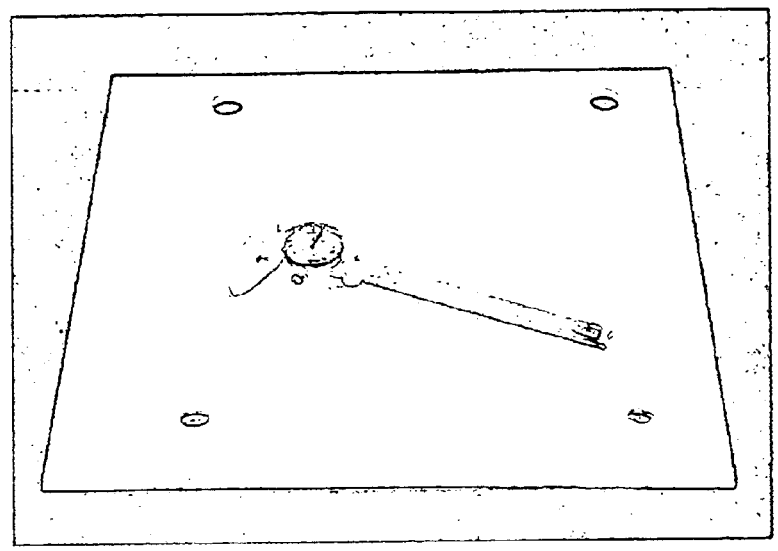
Figure 7C:
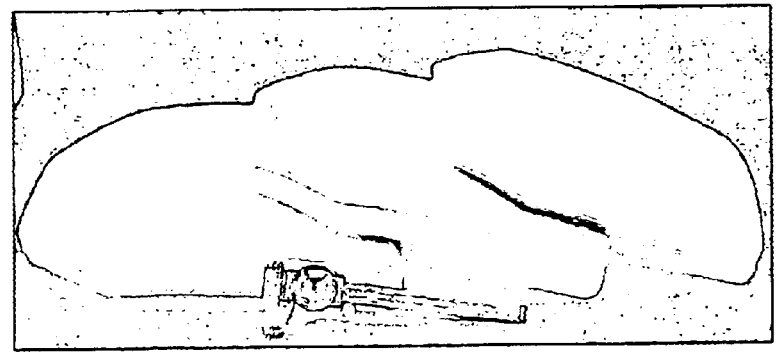

The ballistic results show that the armor designs employing lower cost reaction bonded ceramics had mass efficiencies equivalent to armors of the same design using hot pressed ceramics. This has enabled the production of cost effective armor products for various applications. In FIGS. 7A and 7C, for example, the aircraft armor and personnel armor tiles were fabricated from SiC-filled RBSC. The vehicle armor plate of FIG. 7B was fabricated from RBBC.

INDUSTRIAL APPLICABILITY

The reaction bonded boron carbide composite materials of the instant invention possess exceptional hardness and stiffness, low specific gravity and relatively high flexural strength. Although the instant disclosure has focused primarily on the potential application of the instant materials as anti-ballistic armor, they should also find many applications where rigidity and low specific gravity are important materials properties, such as in the precision equipment industries. The instant composite materials might also be attractive as abrasives or wear-resistant parts. Further, these boron carbide composites may find applications in the nuclear industry, specifically, in applications where neutron absorption is important.

The ceramic armors of the instant invention, possessing the desirable properties of low specific gravity and high hardness, should be particularly useful against small arms fire, e.g., as body armor, and as aircraft armor. The present RBBC materials might also find application as armor for marine vessels and ground-based vehicles, e.g., for heavier threats.

An artisan of ordinary skill will readily appreciate that numerous variations and modifications can be made to the invention as disclosed and exemplified above without departing from the scope of the invention as set forth in the appended claims.

What is claimed is:

1. A ballistic armor, comprising:
at least one body having a front face and a rear face, the front face being the surface upon which a ballistic projectile impinges on said body, the body comprising a composite material having a hardness of at least about 1100 kg/mm² as measured with a Vickers indenter using a 1 kilogram load, the composite material further comprising
   (a) a matrix comprising silicon carbide crystallites, wherein at least about 90 volume percent of crystallites of said silicon carbide are smaller than about 100 microns in diameter;
   (b) at least 65 percent by volume of a reinforcement phase comprising at least one filler material comprising boron carbide dispersed throughout said matrix; and
   (c) an infiltrant phase comprising silicon dispersed throughout said matrix.

2. The ballistic armor of claim 1, wherein said at least one filler material comprises a plurality of crystallites, and further wherein at least 90 volume percent of said filler material crystallites are smaller than about 100 microns in diameter.

3. The ballistic armor of claim 2, wherein substantially all of said filler material crystallites are smaller than about 106 microns in diameter.

4. The ballistic armor of claim 2, wherein substantially all of said filler material crystallites are smaller than about 90 microns in diameter.

5. The ballistic armor of claim 2, wherein at least 90 volume percent of said filler material crystallites are smaller than about 55 microns in diameter.

6. The ballistic armor of claim 2, wherein at least 85 volume percent of said filler material crystallites are smaller than about 75 microns in diameter.

7. The ballistic armor of claim 2, wherein at least 97 volume percent of said filler material crystallites are smaller than about 70 microns in diameter.

8. The ballistic armor of claim 1, wherein said infiltrant phase has dissolved therein at least one substance comprising boron.

9. The ballistic armor of claim 1, wherein said composite material comprises no more than about 30 percent by volume of said infiltrant phase.

10. The ballistic armor of claim 1, wherein said matrix comprises no more than about 24 percent by volume of silicon carbide produced in-situ.

11. The ballistic armor of claim 1, further comprising a backing layer contacting said rear face of said at least one body.

12. The ballistic armor of claim 11, wherein said infiltrant phase has dissolved therein at least one source of boron.

13. The ballistic armor of claim 11, wherein said composite material comprises reaction-bonded boron carbide.

14. The ballistic armor of claim 11, wherein said composite material comprise at least 65 percent by volume of said filler material.

15. The ballistic armor of claim 11, wherein said backing layer comprises at least one fiber-reinforced plastic material.

16. The ballistic armor of claim 15, wherein said fiber comprises at least one material selected from the group consisting of polyethylene, aramid and glass.

17. A ballistic armor, comprising a generally plate-shaped body, the body comprising:
a composite material comprising
   (a) a reinforcement phase comprising boron carbide;
   (b) a matrix comprising silicon carbide; and
   (c) no more than about 30 percent by volume of an infiltrant phase comprising silicon dispersed throughout said matrix phase,
   the body furthermore having a mass efficiency of at least about 4.1 when tested under the following conditions:
      7.62 mm projectile
      unit layers of polymer composite backing materials, each of said unit layers consisting of two tapes of unidirectional extended-chain polyethylene fibers in a thermoplastic resin matrix, cross-plied at right angles to one another
      total armor system areal density of about 29 kg/m2
      outer tactical vest simulant comprising 28 plies of 600 denier KM2 blanket comprising rip-stop nylon.

18. The ballistic armor of claim 17, wherein said body has a four-point flexural strength of at least about 200 MPa.

19. The ballistic armor of claim 17, wherein said body has a four-point flexural strength of at least about 260 MPa.

20. The ballistic armor of claim 17, wherein substantially all of said boron carbide is smaller than 45 microns in crystallite size.

21. The ballistic armor of claim 17, wherein said body has a hardness of at least about 1670 kg/mm$^2$ as measured with a Vickers indenter using a 1 kg load.

22. The ballistic armor of claim 21, wherein said composite material further comprises at least 70 percent by volume of said boron carbide.

23. The ballistic armor of claim 17, wherein at least said matrix and said at least one filler material comprises crystallites, and further wherein no more than about 10 percent of the total volume of said crystallites are larger than about 100 microns in diameter.

24. The ballistic armor of claim 17, wherein said infiltrant phase has dissolved therein at least one substance comprising boron.

25. The ballistic armor of claim 17, further comprising a ballistic stopping power of at least 90% that of armor grade boron carbide when tested under the following conditions:

7.62 mm projectile unit layers of polymer composite backing material, each of said unit layers consisting of two tapes of unidirectional extended-chain polyethylene fibers in a thermoplastic resin matrix, cross-plied at right angles to one another total armor system areal density of about 30 kg/m$^2$ an outer tactical vest simulant comprising 28 plies of 600 denier KM2 blanket having rip-stop nylon armor grade boron carbide plate thickness of about 0.69 cm.

* * * * *